United States Patent
Knoll

(10) Patent No.: US 9,103,701 B2
(45) Date of Patent: Aug. 11, 2015

(54) ASSEMBLY FOR CONNECTING A MEASURING INSTRUMENT TO A CONTAINER CONTAINING THE MEDIUM TO BE MEASURED

(75) Inventor: Guido Knoll, Hergensweiler (DE)

(73) Assignee: IFM ELECTRONIC GMBH (DE)

( * ) Notice: Subject to any disclaimer, the term of this patent is extended or adjusted under 35 U.S.C. 154(b) by 228 days.

(21) Appl. No.: 13/576,214

(22) PCT Filed: May 12, 2011

(86) PCT No.: PCT/EP2011/057664
§ 371 (c)(1),
(2), (4) Date: Jul. 31, 2012

(87) PCT Pub. No.: WO2011/141534
PCT Pub. Date: Nov. 17, 2011

(65) Prior Publication Data
US 2013/0047740 A1   Feb. 28, 2013

(30) Foreign Application Priority Data

May 12, 2010  (DE) .......................... 10 2010 020 396

(51) Int. Cl.
*G01D 11/00*  (2006.01)
(52) U.S. Cl.
CPC ...................................... *G01D 11/00* (2013.01)
(58) Field of Classification Search
CPC  G01D 11/00; G01L 19/0007; G01L 19/0084; G01L 19/147
USPC .......................................................... 73/756
See application file for complete search history.

(56) References Cited

U.S. PATENT DOCUMENTS

| | | |
|---|---|---|
| 4,889,319 A | 12/1989 | Phillips et al. |
| 5,400,655 A | 3/1995 | Tamai et al. |

(Continued)

FOREIGN PATENT DOCUMENTS

| | | |
|---|---|---|
| DE | 2757607 A1 | 12/1977 |
| DE | 4002339 A1 | 8/1991 |

(Continued)

OTHER PUBLICATIONS

International Search Report mailed Nov. 2, 2011; PCT/EP2011/057664; Int'l File Date: May 12, 2011; IFM Electronic GmbH.
German Office Action dated May 21, 2012; 4 pages.

*Primary Examiner* — Lisa Caputo
*Assistant Examiner* — Philip Cotey
(74) *Attorney, Agent, or Firm* — Schmeiser, Olsen & Watts, LLP

(57) ABSTRACT

The invention relates to an assembly, in particular for measuring a process variable, which consists of a measuring instrument having a process connection and a housing, which is partially rotationally symmetrical at least in the region of the process connection, and of an adapter having a through-hole, which extends in the axial direction, and a sealing web in the through-hole. The measuring instrument and the adapter are connected to each other in a releasable and sealed manner via two sealing surfaces. According to the invention, at least one of the sealing surfaces then has a coating composed of parylene. The invention furthermore relates to an assembly for the releasable and sealed connection of two medium-carrying parts, in particular pipelines.

19 Claims, 3 Drawing Sheets

(56) References Cited

U.S. PATENT DOCUMENTS

| | | | |
|---|---|---|---|
| 5,824,909 A * | 10/1998 | Kathan et al. | 73/706 |
| 5,892,156 A * | 4/1999 | Kathan et al. | 73/706 |
| 6,342,140 B1 | 1/2002 | Weyl et al. | |
| 6,363,790 B1 | 4/2002 | Floegel et al. | |
| RE38,557 E * | 7/2004 | Englund et al. | 73/706 |
| 7,144,622 B1 | 12/2006 | Stecher et al. | |
| 7,240,557 B2 | 7/2007 | Mueller et al. | |
| 7,861,598 B2 | 1/2011 | Drewes et al. | |
| 8,052,329 B2 | 11/2011 | Ono et al. | |
| 2003/0070490 A1* | 4/2003 | Yamakawa | 73/754 |
| 2003/0150275 A1* | 8/2003 | Wagner et al. | 73/715 |
| 2004/0200287 A1* | 10/2004 | Mueller et al. | 73/715 |
| 2005/0254741 A1 | 11/2005 | Norimatsu | |
| 2009/0211363 A1* | 8/2009 | Drewes et al. | 73/723 |
| 2010/0307254 A1* | 12/2010 | Klosinski et al. | 73/756 |

FOREIGN PATENT DOCUMENTS

| | | |
|---|---|---|
| DE | 19628551 A1 | 2/1997 |
| DE | 20002810 U1 | 2/2000 |
| DE | 10103223 A1 | 11/2001 |
| DE | 10106129 A1 | 1/2003 |
| DE | 20314133 U1 | 8/2004 |
| DE | 202004007128 U1 | 9/2004 |
| DE | 102009028662 A1 | 5/2010 |
| DE | 102009028663 A1 | 5/2010 |
| EP | 0 321 995 A2 | 6/1989 |
| JP | 2004037388 A | 2/2004 |
| WO | 2005/045144 A2 | 5/2005 |
| WO | 2006058861 A1 | 6/2006 |
| WO | 2010031396 A1 | 3/2010 |
| WO | 2010072601 A1 | 7/2010 |

* cited by examiner

ASSEMBLY FOR CONNECTING A MEASURING INSTRUMENT TO A CONTAINER CONTAINING THE MEDIUM TO BE MEASURED

FIELD OF TECHNOLOGY

The present invention relates to an assembly for connecting a—measuring instrument to a container containing the medium to be measured and an assembly for the releasable and sealed connection of two medium-carrying parts, in particular pipelines, as well as a measuring instrument for the process measurement technology.

BACKGROUND

Measuring instruments are frequently used in automation engineering for monitoring a medium or, as the case may be the properties of a medium. In this connection, the filling level, the pressure or the temperature of the medium in a container are measured. Such measuring instruments mostly consist of a bottom part designated as process connection and a housing placed thereon as an upper part, which is mainly used as a protection for the sensor and the associated electronics. The process connection connects the measuring instrument to a container or, as the case may be to a pipeline or, as the case may be to a connecting piece and usually contains the sensor element as such. The sensor element is, for instance, configured as a piezoresistive or capacitive measuring cell in pressure measurement instruments.

In order to connect the measuring instrument to the equipment or, as the case may be, to the container containing the medium to be measured, sleeve-like adapters have proven advantageous, such as they are, for instance, described in the German specification DE 196 28 551 B4. These adapters have a through-hole that extends in the axial direction and a circumferential sealing web configured as a spring web. The measuring instrument is usually screwed into the adapter, the bottom part of the measuring instrument, i.e. the process connection, being in contact with the circumferential sealing web. The contact pressure between the process connection and the sealing web can be defined by screwing in the measuring instrument with a specific torque.

In some applications, it has proven to be advantageous to realize the connection between the process connection and the adapter without an additional sealing element because a separate seal is a losable component, on the one hand, which represents another cost factor as such, and on the other hand tolerances are consequently also added up. Without the additional sealing element, the contact surfaces of the process connection and the adapter form a so-called metal-metal seal. Connections with such a sealing concept are in fact not suitable for frequently releasing the connection, which can be disadvantageous for the inspection and maintenance work to be carried out.

SUMMARY

The underlying advantage of the invention is now to make the connection between the measuring instrument and the adapter or, as the case may be between both halves of the adapter of the assemblies mentioned above, or as the case may be the connection between the process connection and the measuring cell easier to use without an additional sealing element, and, in particular, further improve it with respect to repetitive releasing.

According to the present invention, this advantage is attained by means of an assembly, as well as by means of a measuring element. Advantageous embodiments of the invention are specified in the sub-claims.

According to the present invention, one of the sealing surfaces has a parylene coating. Sealing surfaces are understood as the contact surfaces respectively associated with the measuring instrument and with the adapter, or respectively to both halves of the adapter, where the measuring instrument and the adapter, or as the case may be both halves of the adapter contact one another in the region of the sealing web. Only one, or also both sealing, surfaces can be coated in each case. The durability was tested by means of a million pressure cycles at pressures up to 50 bar using the example of a pressure measuring instrument.

Two further aspects of the invention will be described below: the releasable and sealed connection of two medium-carrying parts along with a measuring instrument for static and dynamic pressure measurements, as well as the first aspect, the interaction of the process connection of a measuring instrument and an adapter; because the invention can also be used for the connection of two medium-carrying parts as well as being used as a pressure-measuring instrument. Medium-carrying parts are, in particular, understood to be pipelines or fittings, such as valves. If, for example, two pipelines are, in particular, to be connected in a releasable manner to equipment for the food industry, similar problems arise to some extent as when coupling measuring instruments to an industrial facility.

The advantage of the solution according to the present invention in particular is that the parylene coating prevents mutual abrasion of the sealing surfaces when joining the measuring instrument and the adapter, or as the case may be both halves of the adapter, or as the case may be the process connection and the measuring cell. This coating thus serves as a protection, but does not have a deteriorative effect on the good sealing properties of the metal-metal seal or, as the case may be when sealing material combinations without elastic properties.

Parylene is a hydrophobic, chemically resistant coating material with good barrier characteristic compared to inorganic and organic media, strong acids, leaches, gases and water vapor. As a biostable and biocompatible coating, it has FDA approval (Food and Drug Administration), is temperature resistant up to 220° C. and mechanically stable from −200° C. to +150° C. It is further advantageous that low mechanical tensions are generated during coating, and that it is in particular abrasion-proof, which is why such a coating is highly suitable for protecting the parts forming the metal-metal seal. This is also evident when the contact surfaces between both sealing surfaces are reduced to a quasilinear region in some applications. The parylene coating then yields to the increased compressive strength and does not tear. Furthermore, scratches and in general rough surfaces of the sealing surface can be smoothened by the parylene coating, which increases the sealing effect. A coating consisting of parylene is thus a highly precise barrier layer with good gliding properties.

The coating is usually applied by condensation from the gas phase, i.e. Parylene is vapor-deposited on the work piece. This has the advantage that a largely uniform coating is possible. The vapor-deposited layers can also be organically modified SiOX layers. On the other hand, there are also other coatings which are applied in the fluid or powder phase, such as sol-gel coatings or varnishes, where this uniformity is not, or not easily possible. This uniformity is, however, necessary with very thin coatings in order not to exceed the tolerance limits.

In this connection, similar materials, whose starting material is di-para-xylylene (or halogenated substituents), should also be encompassed in the term "parylene." The generic term for these materials is called cyclophane. Parylene essentially is available in four different dimers with the following designations: parylene C, parylene N, parylene D and parylene F, parylene C being preferred.

Such coatings consisting of parylene are carried out by Plasma-Parylene Systems GmbH in Rosenheim, for example.

Apart from parylene, coatings consisting of polyetheretherketone (PEEK) or of polytetrafluoroethylene (PTFE) are also conceivable because, similarly to parylene, they are self-lubricating and accomplish a good dry lubrication effect, PEEK being preferentially still blended with PTFE and/or silicone portions to improve this property. PEEK is very stable chemically and does not have flow properties with typical load types and temperature ranges, e.g. in the food and pharmaceutical industry. As it is also approved for the food and pharmaceutical industry (FDA approval), in practice it stands out compared to other, similarly suitable high-quality plastic materials. It is likewise conceivable to add at least a filler or reinforcing material, i.e. a polymeric matrix with microscale and/or nanoscale particles consisting of e.g. ceramic, metal, glass, graphite or an elastomer or, as the case may be a combination of these materials.

In an advantageous embodiment the parylene layer has a thickness of between 0.1 pm and 50 pm. The thickness is in particular preferably between 5 pm and 30 pm, because there is an optimal relationship between technical effort and benefit in this range.

In another preferred embodiment, the sealing web is configured as a spring web. The spring web is prestressed when the measuring instrument is screwed into the adapter or, as the case may be when both halves of the adapter are joined. This prestressing of the sealing web now acting as a spring web generates a "force buffer" which can react dynamically to pressure and temperature fluctuations, i.e. the influences affecting the sealing effect. The prestressing is either further increased, or the prestressing decreases, as a result of which it is still ensured that the contact pressure originating at the spring web is strong enough to guarantee a durable sealing effect. The prestressing is preferably defined by a circumferential shoulder-like extension provided at the process connection. By means of this outward extension the process connection touches the adapter, as a result of which the insertion or, as the case may be screwing depth is limited depending on the type of the releasable connection. In the case of a screw connection, the screwing depth and thus the prestressing of the spring web must not be determined by a predefined tightening torque; it is rather defined by the constructive design of the assembly itself.

In an especially preferred embodiment, the releasable connection between the measuring instrument and the adapter, or as the case may be between both halves of the adapter, is realized by means of a screw and/or flange and/or clamping connection. The screw connection is established by means of an external thread provided on the process connection or, as the case may be on one half of the adapter and an internal thread provided on the respectively complementary half of the adapter. In the case of flange and clamping connections, snap-in, plug-in and clamping devices, in particular clamping connections, are conceivable with which the process connection inside the adapter or both halves of the adapter can be connected to one another in a releasable but firm manner.

Advantageous applications of the invention involve measuring instruments, in particular for measuring a process variable, which are connected to industrial plants ranging from dairies and breweries to pharmaceutical facilities, said measuring instruments thus being subject to specific demands with respect to temperature and pressure fluctuations, changes in the medium to be measured and automatic cleaning processes. All physical variables which are relevant to the process measuring technology, in particular the variables pressure, temperature, flow, or, as the case may be flow rate, filling level and analytical measuring technology are to be understood as process variables.

All devices in contact with media such as fluids or gases or media-carrying devices such as pipelines, containers, fitting, valves and the like are to be understood as media-carrying parts within in the sense of the invention. Accordingly, connections for media-carrying parts are connections between pipelines, containers and the like. Containers, pipelines, etc. are understood under the term container.

BRIEF DESCRIPTION OF THE DRAWINGS

The invention will be explained below in connection with figures based on exemplary embodiments.

The figures show.

Unless otherwise specified, like reference numerals designate like parts having the same meaning.

DETAILED DESCRIPTION

Figure 1:
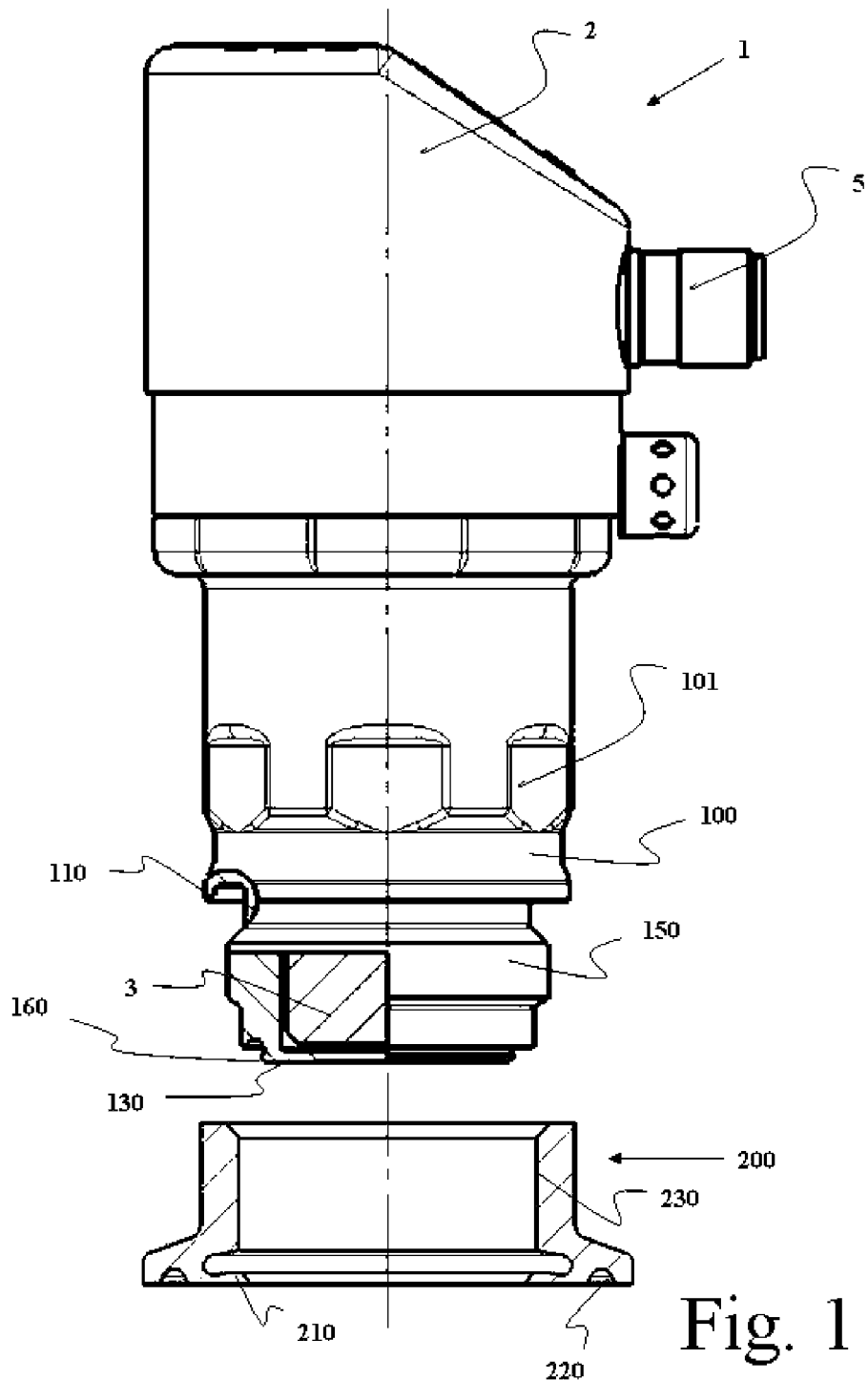
FIG. 1: a partial sectional view of an assembly according to the present invention prior to assembling.

FIG. 1 shows a measuring instrument 1 for the process measuring technology, in the present case a pressure measuring instrument, which can basically be divided into a process connection 100 and a housing 2 placed thereon. Even though a pressure measuring instrument is shown here by way of example, the invention is, however, not limited to such a measuring instrument, but can comprise any measuring instruments of the type mentioned above, in particular temperature and flow measuring instruments. The process connection 100 has a hexagon 101 on the outer side, a first outwardly extending circumferential stopping device 110 and an external thread 150. Related details will be described in more detail in the figures below. If only one threaded connection between the measuring instrument 1 and the adapter 200 is mentioned, this merely represents a preferred embodiment. All types of known connection techniques, such as, for example, snap-in and coupling connections are obviously conceivable.

The process connection 100 is preferably made of stainless steel (V4A, V2A), high-quality steels or hard plastics. Stainless steel is highly suitable for applications in the food industry. The measuring cell 3 and the position of the measuring cell 3 on the sealing spring web 130 of the measuring instrument can be seen in the small section cut-out in the form of a longitudinal section view at the bottom on the left side. Detailed information in this regard is shown in the German specification DE 196 28 551 B4 mentioned above. Furthermore, the chamfered sealing border 160 can be seen in the cross section.

FIG. 1 further shows an adapter 200, which as in the present case can be one half of a clamping connection. In this case, the invention is, however not limited to clamping connections but rather encompasses all comparable adaptors or flange devices. Owing to the applications in the food industry, the adapter 200 is preferably executed in stainless steel (V4A, V2A), very hard plastics being in principle also conceivable. There is a circumferential groove 220 on the bottom part of the adaptor 200, into which a flat seal having a bilateral elevation can be inserted. These elevations then engage in the grooves 220 and thus prevent the flat seal from slipping if two similar adapters 200 are to be arranged opposite to one another. The circumferential sealing web 210 can also be seen.

The sealing web 210 will only be designated as "sealing spring web" below because the spring action of the sealing web 210 represents a preferred embodiment. Notwithstanding that, the invention can also be executed with a sealing web without spring-like properties, and is consequently not limited to a sealing spring web. The spring elasticity can likewise be accomplished by means of the intrinsic elasticity of the components used or, as the case may be, a by a rearward elastic position.

The sealing spring web 210—viewed in diameter from the cross section—measures 2-8 mm in length in this region, and it can definitely be longer as well. The inner wall of the adapter has an internal thread 230, with which the external thread 150 of the process connection 100 can engage when the measuring instrument 1 is screwed in. In order to illustrate the possibility of screwing one into another, the measuring instrument 1 and the adapter 200 are shown aligned, i.e. with the same central axis. It is therefore well conceivable how the measuring instrument 1 can be screwed into the adapter 200.

Once the measuring instrument 1 has been screwed deeply enough into the adapter 200, the sealing edge 160 of the process connection 100 (FIG. 2) contacts the sealing spring web 210. Owing to the spring elastic properties of the sealing web 210, it can be prestressed in the axial direction in the range of a few tenths of a millimeter, preferably between 0.08 mm and 0.2 mm. The maximum screwing depth is limited by a circumferential stopping device 110 at the upper border of the process connection 100.

Figure 2:
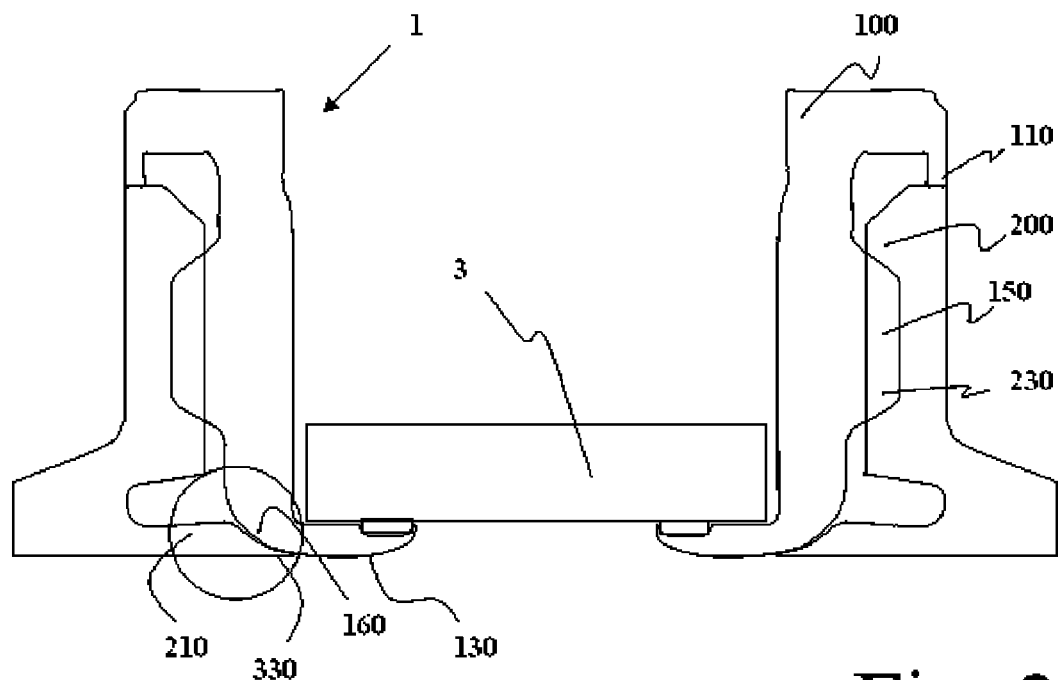
FIG. 2: a longitudinal section view of an assembly according to the present invention consisting of an adapter and a screwed-in process connection of a measuring instrument.
Figure 3:
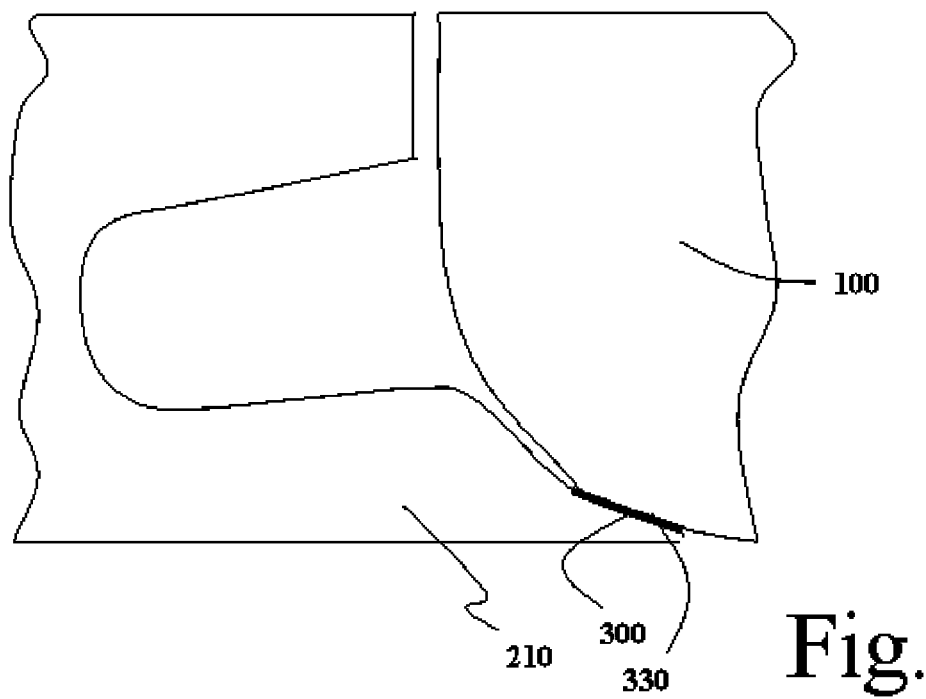
FIG. 3: an enlarged detail from FIG. 2 showing the coating of the sealing spring web of the adapter.

The assembly according to the present invention consisting of the measuring instrument 1—represented by its process connection 100 and the adapter 200—is shown in FIGS. 2 and 3, where FIG. 3 shows the detail displayed by means of a circle in FIG. 2 in an enlarged manner. The measuring instrument 1 and the adapter 200 are connected to one another by means of a screw connection, in which the external thread 150 of the process connection 100 interacts with the internal thread 230 of the adapter 200. During the screwing procedure, the region of the process connection 100, designated as sealing edge 160, contacts the adapter 200, i.e. its sealing web or as the case may be the sealing spring web 210, thus forming a metal-metal seal. These contact surfaces are designated as sealing surfaces. The deeper the measuring instrument 1 is screwed into the adapter 200, the stronger the prestressing of the sealing spring web 210. A limit stop 100 is provided to limit the maximum screwing depth.

In FIG. 3, the coating 300 is schematically shown by means of a thicker black line. It is irrelevant to the invention whether only the sealing surface of the sealing spring web 210 or the sealing surface of the process connection 100, or both sealing surfaces are coated, or as the case may be the entire sealing spring web 210, the entire adapter 200, and/or the entire process connection 200, etc. What is essential to the invention is that there is a coating 300 between the parts that contact one another: the sealing spring web 210 and the sealing edge 160 of the process connection 100.

Figure 4:
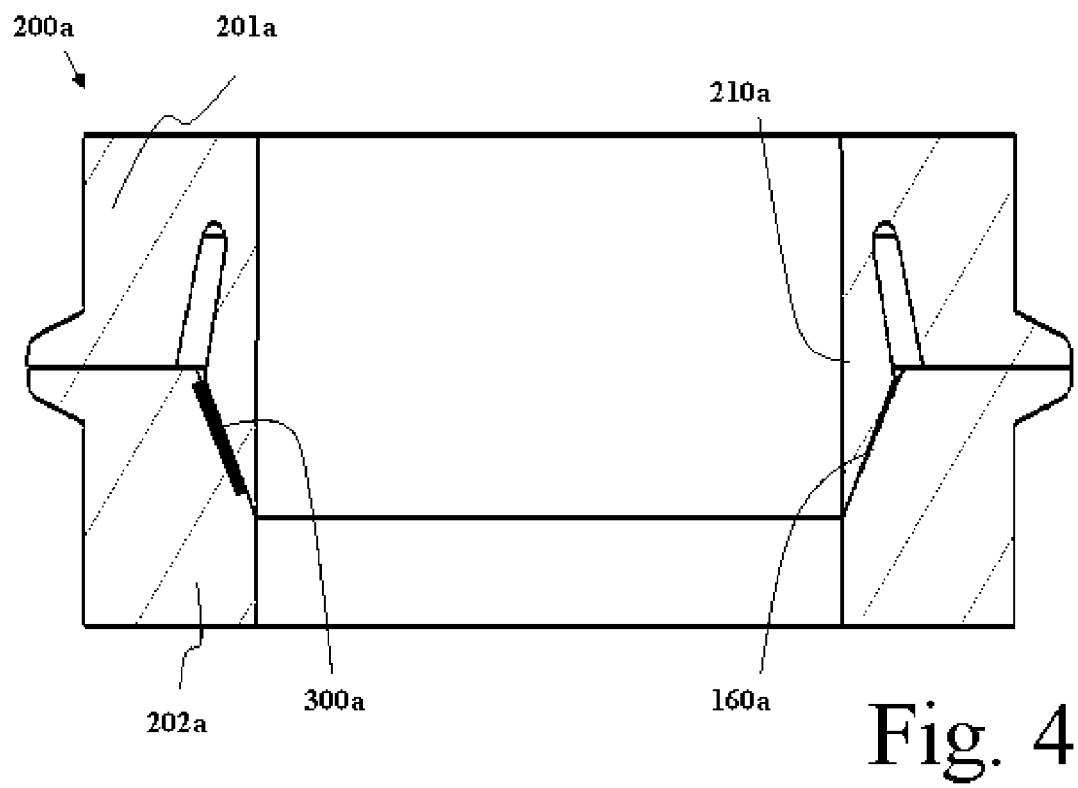
FIG. 4: a longitudinal section view across the wall of an adapter for the connection of two pipeline connections

FIG. 4 shows the application of the inventive principle to the connection of two pipelines which are not shown in this document. The adapter 200a, which establishes the connection, is in this case divided into a first part 201a and a second part 202a. Both parts 201a, 202a are placed on top of the pipelines as an extension of them, or as the case may be are a part of them, the connection between the adapter parts 201a, 202a and the ends of the pipelines being preferentially welded. The adapter parts 201a, 202a are constructed differently, the first part 201a having the sealing spring web 210a. The sealing spring web 210a, in this case, is aligned in the axial direction. Ideally, the internal diameter of the adapter 200a matches the internal diameter of the pipeline. For this reason, the axial alignment of the sealing spring web 210a is a prime choice. Compared to the inwardly aligned embodiment for sealing a measuring instrument, the functionality is, however, identical. The second part of the adapter 202a has a sealing edge 160a. The sealing spring web 201a contacts the sealing edge 160a, as in the exemplary embodiment described above, as a result of which a metal-metal seal is formed. The advantages of the invention can also be applied to the connection of pipelines by means of the coating 300a. The coating 300a is deliberately exaggerated by means of a black line in FIG. 4 for reasons of clarification, therefore no conclusions can be drawn as regards the exact thickness or length. As it has already been presented in FIG. 3, it is irrelevant to the invention to what extent, i.e. what parts are coated, but the surface between the sealing spring web 210a and the sealing edge 160a that contact one another must be coated.

Figure 5:
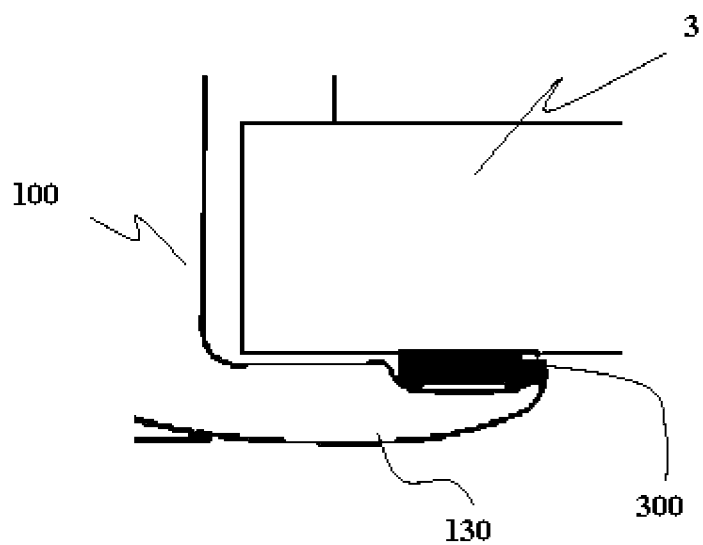
FIG. 5: an enlarged detail from FIG. 2 showing the coating of the spring web of the process connection.

FIG. 5 shows a detail from FIG. 2, which illustrates the position of the pressure measuring cell 3 on the sealing spring webs 130 of the process connection 100. As is known from the German specification DE 196 28 551 B4, the pressure-measuring cell, which is usually made of ceramic, can be placed on sealing spring webs 130 in order to utilize the already described advantages of the "force buffer". Ultimately, the use of a separate sealing element has, however, always been assumed in this connection, e.g. by means of a flat sealing ring made of PTFE. The (quasi) metal-metal seal could, however, also be used in this case, the designation "metal-metal" no longer being fully appropriate. As it involves the type of seal, i.e. the seal without an additional sealing means, the designation metal-metal seal will be maintained in order to show the connection with the previously described embodiments.

As in FIG. 4, the coating 300 is deliberately exaggerated by means of a black line for reasons of clarification in this case as well, therefore no conclusions can be drawn as regards the exact thickness or length. As already presented in FIG. 3, it is irrelevant to the invention to what extent, i.e. what parts are coated, but the surface between the sealing spring web 210a and the sealing edge 160a that contact one another must be coated. The concept of the invention according to the previously described embodiments can basically be applied in a similar way to this embodiment as well. Reference is made to the corresponding passages in order to avoid repetition.

REFERENCE NUMERALS

1 measuring instrument
2 housing
3 measuring cell 5 connector socket
100 process connection
101 hexagon
110 stop
130 sealing spring web (of the measuring instrument)
150 external thread
160, 160a sealing edge
200, 200a adapter
201a first part of the adapter
202a second part of the adapter
210, 210a sealing web, sealing spring web (of the adapter)
220 groove
230 internal thread
300 coating
330 metal-metal seal The claims are as follows:

1. An assembly, for measuring a process variable, comprising:
a measuring instrument having a process connection and a housing; and
an adapter having a through-hole to receive the process connection within the through-hole when the measuring instrument and the adapter are connected to one another in a releasable and sealed manner, the through-hole extending in an axial direction, and a sealing web in the through-hole, wherein a sealing surface of the adapter and a sealing surface of the measuring instrument directly contact each other when the measuring instrument and the adapter are connected to one another in the releasable and sealed manner,
wherein at least one of the sealing surface of the adapter and the sealing surface of the measuring instrument have a conformal protective polymer coating so that a coating exists between the sealing surface of the adapter and the sealing surface of the measuring instrument without an additional sealing element.

2. The assembly according to claim 1, wherein a thickness of the conformal protective polymer coating is between 0.1 µm and 50 µm.

3. The assembly according to claim 2, wherein a thickness of the conformal protective polymer coating is between 5 µm and 30 µm.

4. The assembly according to claim 1, wherein the sealing web is configured as a spring web.

5. The assembly according to claim 4, wherein the spring web is subject to prestressing when the measuring instrument is screwed into the adapter, acting in the axial direction, which is defined by a circumferential, shoulder-type extension provided at the process connection.

6. The assembly according to claim 1, wherein the releasable connection between the measuring instrument and the adapter is realized by means of a screw, flange and/or clamping connection.

7. The assembly according to claim 1, wherein the process variable includes pressures, temperatures, flows and filling levels.

8. An assembly for a releasable and sealed connection of two medium-carrying parts, for pipelines, in which both of the two media-carrying parts are respectively configured as rotationally symmetrical at one end and are respectively inserted into one half of an adapter with a through-hole extending in an axial direction, at least one half of the adapter having a sealing web in the through-hole, and there being a releasable and sealed connection via two sealing surfaces, wherein at least one of the two sealing surfaces has a conformal protective polymer coating so that a coating exists between the two sealing surfaces without an additional sealing element;
wherein the two sealing surfaces include a sealing surface of a first part of the adapter and a sealing surface of a second part of the adapter, the two sealing surfaces directly contacting one another.

9. The assembly according to claim 8, wherein a thickness of the conformal protective polymer coating is between 0.1 µm and 50 µm.

10. The assembly according to claim 8, wherein the sealing web is configured as a spring web.

11. The assembly according to claim 10, wherein the spring web is subject to prestressing when both halves of the adapter are joined.

12. The assembly for a measuring instrument according to claim 8, wherein the releasable connection between both halves of the adapter is realized by means of a screw, flange and/or clamping connection.

13. A measuring instrument for process measurement technology, comprising:
a process connection;
a housing placed on top of the process connection; and
a measuring cell;
wherein the process connection includes an inwardly protruding sealing web, the measuring cell directly contacting the inwardly protruding sealing web to establish a sealed connection between the process connection and the measuring cell via two sealing surfaces, the two sealing surfaces including a sealing surface of the measuring cell and a sealing surface of the process connection;
wherein at least one of the two sealing surfaces has a conformal protective polymer coating so that a coating exists between the sealing surface of the measuring cell and the sealing surface of the process connection without an additional sealing element.

14. The measuring instrument according to claim 13, wherein a thickness of the conformal protective polymer coating is between 0.1 µm and 50 µm.

15. The measuring instrument according to claim 13, wherein the inwardly protruding sealing web is configured as a spring web.

16. The measuring instrument according to claim 15, wherein the inwardly protruding spring web is subject to prestressing when the measuring instrument is screwed into an adapter, acting in the axial direction, which is defined by a circumferential, shoulder-type extension provided at the process connection.

17. The measuring instrument according to claim 13, wherein a releasable connection between the measuring instrument and an adapter is realized by means of a screw, flange and/or clamping connection.

18. The measuring instrument according to claim 13, wherein the measuring instrument is suitable for measuring a process variable, the process variables being pressures, temperatures, flows and filling levels.

19. The measuring instrument according to claim 13, wherein a thickness of the conformal protective polymer coating is between 5 µm and 30 µm.

* * * * *